United States Patent
Berglind et al.

[11] Patent Number: 6,062,245
[45] Date of Patent: May 16, 2000

[54] GASEOUS FUEL BURNER MANIFOLD WITH INTEGRAL PRESSURE REGULATOR ASSEMBLY

[76] Inventors: Eric J. Berglind, 108 S. 4th Ave., St. Charles, Ill. 60174; James J. Nonnie, 754 Meadow Wood Dr., Joliet, Ill. 60431; Stefan J. Szewczyk, 19244 Wildwood Ave., Lansing, Ill. 60438; Norman K. Peck, 256 Arbor La., Bloomindale, Ill. 60108; Donald M. Krueger, 11126 Mandel Ave., Westchester, Ill. 60154; Paul D. Frazier, 3007 Paula Dr., West Plains, Mo. 65775

[21] Appl. No.: 08/975,960
[22] Filed: Nov. 21, 1997
[51] Int. Cl.[7] ................................................. G05D 16/06
[52] U.S. Cl. ...................... 137/12; 137/505; 137/505.29; 137/507; 137/882
[58] Field of Search ........................ 137/12, 505, 505.29, 137/505.41, 507, 882

[56] References Cited

U.S. PATENT DOCUMENTS

| | | | |
|---|---|---|---|
| 4,887,639 | 12/1989 | Lewis et al. | 137/505.41 |
| 5,211,205 | 5/1993 | Grant et al. | 137/505.41 |
| 5,598,869 | 2/1997 | Nelson | 137/882 X |

*Primary Examiner*—Stephen Hepperle
*Attorney, Agent, or Firm*—Terrence (Terry) Martin; Jules Jay Morris; Sean D. Detweiler

[57] ABSTRACT

An integral gas burner manifold and pressure regulator with an inlet fitting received through one wall of the manifold and threadedly engaging in the manifold a regulator body received through a second oppositely disposed wall of the manifold. The body has a valve seat and downstream ports for supplying the interior of the manifold. Portions of the body extending exteriorly of the manifold, retain and seal a housing shell having a pressure responsive diaphragm exposed to the pressure of the ports. A poppet is disposed on the valve seat and is connected to the diaphragm by a rod; and, the poppet is moved by the rod in response to changes in pressure acting on the diaphragm. The diaphragm is preloaded by an adjustable spring.

16 Claims, 2 Drawing Sheets

GASEOUS FUEL BURNER MANIFOLD WITH INTEGRAL PRESSURE REGULATOR ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to the supply of fuel gas to a plurality of burners through a common manifold and particularly relates to such supply as it is implemented in cooking appliances such as in household rangetop or oven burners.

Heretofore, in the manufacture of household cooking appliances, it has been necessary to provide a pressure regulator for supplying fuel gas at a reduced pressure from the supply line to the rangetop or oven burners in order to control the flow of gas and prevent line pressure fluctuations from causing a flame outage and subsequent hazard of explosion due to continued gas flow after the flame outage. This need for a pressure regulator is particularly acute for rangetop burners which are deemed to be attended burners. An attended burner is one which is monitored visually by the user and thus a flame sensor is not utilized to shut off the gas supply valve upon loss of flame or to re-energize a spark ignitor for immediate re-ignition in the event of flame out. However, flame out can occur on a so-called attended top burner and not be noticed by the user until a sufficient amount of unburned gas has flowed through the burner so as to create a hazardous condition.

Household cooking appliances therefore commonly employ a fuel line pressure regulator mounted separately at the inlet of the burner supply manifold. This arrangement requires additional fittings and gas line conduits to make the necessary connections and results in increased cost in the manufacture of the appliance and also the risk of leaks from the additional fittings required to connect the pressure regulator during assembly of the appliance.

Thus it has long been desired to provide a way or means of regulating flow to a fuel gas burner manifold in a manner which is low in manufacturing costs and which minimizes the risk of leakage in service.

BRIEF SUMMARY OF THE INVENTION

It is an object of the present invention to provide a combination gas burner supply manifold and pressure regulator which is low in manufacturing costs, easy to assemble and reliable in service.

The combination of the present invention utilizes an inlet fitting received in a first aperture in one side of a burner manifold with a pressure regulator body received through a second aperture in the opposite side wall of the manifold and threadedly engaging the inlet fitting. A valving surface in the form of a valve seat is defined by the engagement intermediate the sides of the manifold. The pressure regulator body includes a shell portion disposed exteriorly of the manifold which shell houses a pressure responsive diaphragm adjustably preloaded by a spring. A resilient valve obturator is connected to a valve actuating member which extends through the body and inlet fitting and is connected to the pressure responsive member for effecting movement of the obturator in response to changes in pressure in the housing. The valve body is cross-ported within the manifold downstream of the valve seat to permit flow from the valve seat to enter the manifold for supplying fuel burners remotely attached to the manifold.

DETAILED DESCRIPTION OF THE INVENTION

Figure 1:
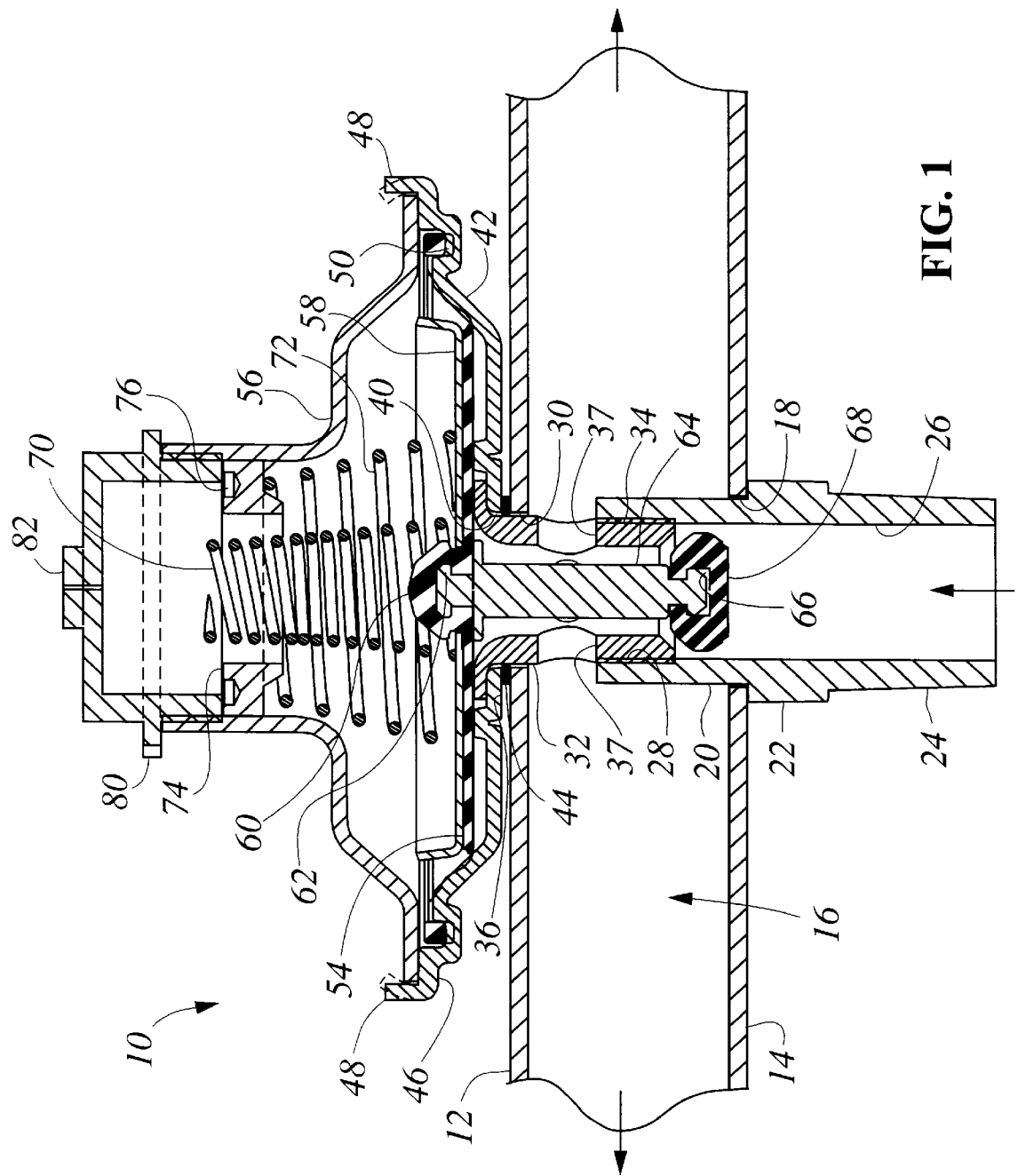
FIG. 1 is a cross-section of the pressure regulator manifold assembly.
Figure 2:
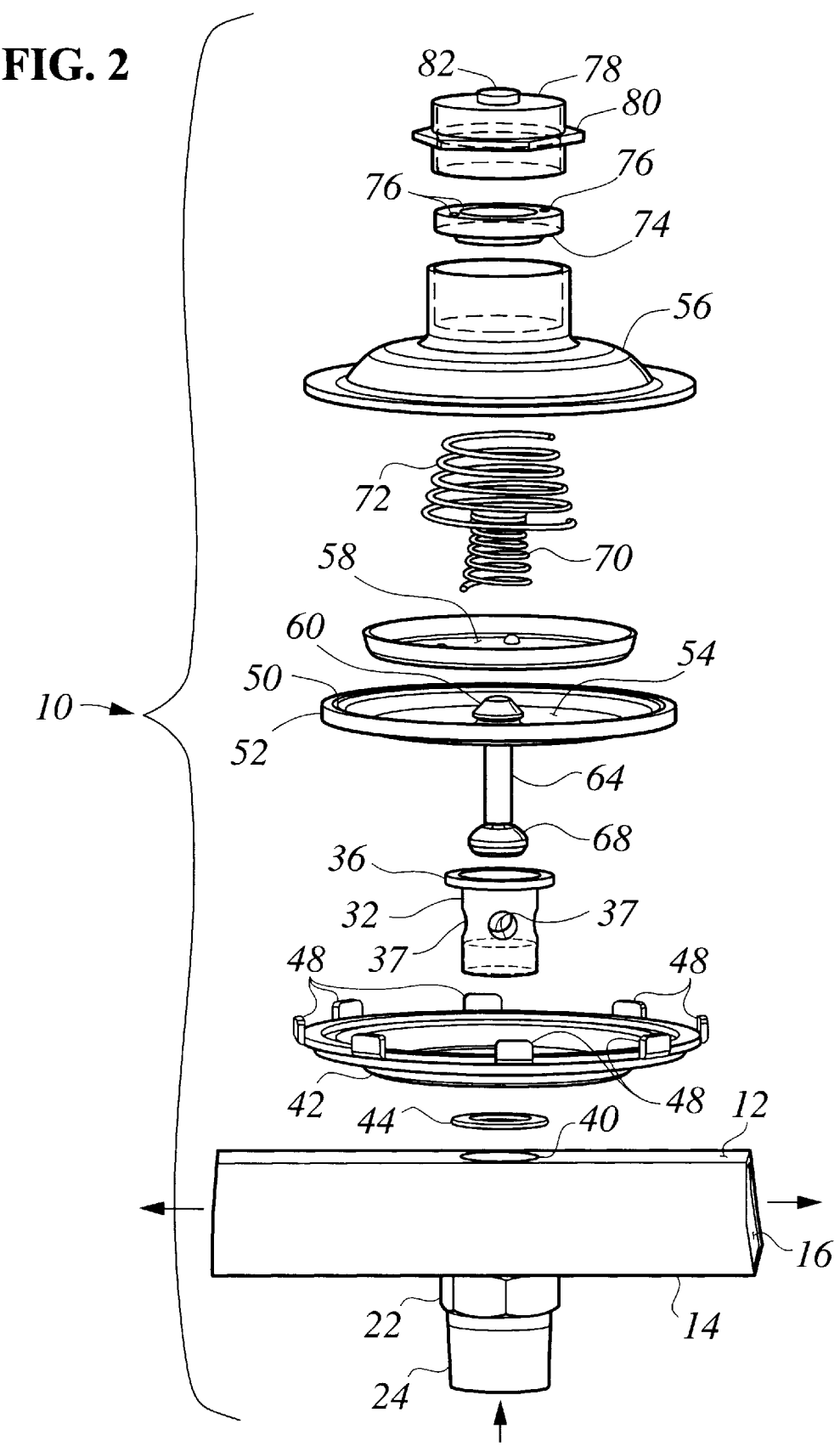
FIG. 2 is an exploded view of the assembly of FIG. 1.

Referring to FIGS. 1 and 2, the assembly of the present invention is indicated generally at 10 and includes a manifold having an upper or first wall portion 12 and a lower or second wall portion 14 and which define therethrough a passage indicated generally at 16 which exhausts in opposite directions as indicated by the black arrows in FIG. I which indicate flow to individual gaseous fuel burners which are not illustrated for the sake of simplicity. It will be understood that the manifold wall portions 12, 14 may comprise separate shells joined together by any suitable expedient, as for example, weldment, or the manifold wall portions may comprise opposite sides of a unitary tubular member.

The lower manifold wall portion 14 has formed therein an inlet aperture or cutout 18 which has received therein an internally extending portion 20 of an inlet fitting 22 which is secured and sealed in the aperture 18 by any suitable expedient, as for example, weldment such as brazing, or by any mechanical technique such as flow drilling and threading therein. The fitting 22 has the exteriorly extending end portion 24 thereof adapted for connection to a gas line by any suitable technique as, for example, threaded connection. The fitting 22 has a passage or bore 26 therethrough and which passage 26 has the upper end of portion 20 thereof provided with internal threads 28.

The upper wall portion 12 of the manifold has a second aperture or cutout 30 formed therein positioned preferably aligned with the inlet aperture 18. Aperture 30 has received therein a reduced diameter portion of valve body 32 which has an annular configuration, with external thread 34 formed on the lower end thereof and with an outwardly extending flange 36 provided on the exterior of the wall portion 12. The valve body 32 has a valving surface, preferably an annular valve seat 38, formed in the lower end thereof. The flange 36 on the upper end of body 32 is received over an aperture 40 formed in a lower housing shell 42; and, the lower housing shell 42 is sealed about the aperture 30 by a suitable resilient seal denoted by reference numeral 44.

Lower housing shell 42 has an outwardly extending circular flange 46 formed peripherally thereabout which flange has a plurality of axially extending tabs or projections 48 formed thereon in circumferentially spaced arrangement. Flange 46 has an annular groove 50 formed therein into which is received an annular bead rim 52 of a resilient flexible diaphragm. Bead rim 52 is retained and sealed in groove 50 by an upper housing shell 56 which is retained on shell 42 by deformation of tabs 48 as indicated in dashed line in FIG. 1.

Diaphragm 54 has a backing plate or cup 58 received against the upper surface thereof; and, plate 58 is apertured and received over a center projection or tower 60 formed in the diaphragm, preferably in snap-locking engagement over the tower 60.

Tower 60 has the underside thereof formed with an undercut groove 62 into which is received in snap-locking arrangement the flanged upper end of an actuator member or rod 64. Rod 64 extends downwardly through valve seat 38. The lower end of rod 64 is similarly engaged in snap-locking arrangement with a groove 66 formed in a resilient obturator or poppet 68. It will be understood that the poppet 68 is configured for sealing against the valve seat surface 38.

At least one and preferably a pair of nested preload springs 70, 72 are received in an upper housing 56; and each has the lower end thereof registered against the upper surface of a preferably cup-shaped diaphragm backing plate 54. The upper end of the outer spring 72 is registered against the undersurface of an annular adjustment ring 74 which is threadedly received in the upper housing shell 56. The adjustment ring 74 has a plurality of circumferentially spaced spanner engaging blind holes 76 formed about the upper surface thereof and which are adapted to be engaged by a spanner wrench (not shown) for rotating the adjustment ring in the housing to alter the compressed length of spring 72 and thereby adjust the preload on the diaphragm backing plate 54.

A cover member or cap 78 having an outwardly extending flange 80 formed thereon is threadedly received in the upper housing shell 56 and provides a closure for the housing 56.

Referring to FIG. 1, the assembly is shown as configured for natural gas usage wherein the undersurface of the closed end of the cap 78 is spaced from the upper end of the inner spring 70 which extends freely upwardly through the adjustment ring 74 and the outer spring 72 is employed to preload the diaphragm.

However, it will be understood that for liquid petroleum gas (LPG) usage cap 78 is unscrewed and inverted and re-engaged threadedly in the shell 56 with the pilot portion 82 formed on the upper surface of the cap inverted and nested in the upper end of spring 70 such that the closed surface of the cap, when inverted, contacts the upper end of spring 70 compressing spring 70 and provides additional preload on the diaphragm backing plate 54. The use of an inverted cap and additional preload spring for LPG usage is well known in the art.

In operation, with the assembly configured as shown in FIG. 1 for natural gas usage, the diaphragm is biased downward by spring 72, with poppet 68 "lifted" or moved downwardly away from the valve seat 38; and, upon application of fuel gas pressure at inlet passage 26, the fuel gas flows through cross ports 37 formed in the valve body 36 and into the manifold chamber 16. If there is an increase in the pressure in the inlet passage 26, the pressure acts on the undersurface of diaphragm 54 and raises the diaphragm and actuating member 64 to move poppet 68 closer to the valve seat 38 and restrict flow thereby reducing the pressure of the flow through the cross ports 37. Decreases in the pressure in inlet passage 26 will result in a lower pressure acting on the undersurface of diaphragm 54 and thus permit the spring 72 to bias the diaphragm downwardly and to increase the opening of poppet 68 with respect to valving surface 38.

The present invention thus provides an improved and reduced cost fuel gas burner manifold with integral pressure regulator which has particular application to gas rangetop burner applications and gas ovens.

Although the present invention has hereinabove been described with respect to the illustrated embodiments, it will be understood that modifications and variations of the invention may be made and the invention is limited only by the following claims.

What is claimed is:

1. A gaseous fuel burner manifold with integral pressure regulator assembly comprising:
    (a) a first and second spaced wall portion of said manifold defining a chamber therebetween, said chamber having at least one outlet port therein adapted for connection to the inlet of a gaseous fuel burner;
    (b) a valve body structure received through a cut-out in said first wall portion;
    (c) an inlet fitting received through a cut-out in said second wall portion, said inlet fitting having portions thereof attached to said valve body structure in said chamber and cooperating with said valve body to define an inlet passage, adapted for external connection to a source of pressurized gaseous fuel, a valving surface in said passage and a port downstream of said valving surface communicating flow therefrom to said chamber;
    (d) a valve obturator disposed for movement with respect to said valving member for controlling flow between said inlet and said downstream port; and,
    (e) pressure responsive means associated with said valve body structure and disposed externally of said chamber adjacent said first wall portion, said pressure responsive means operative in response to pressure changes in said chamber to effect said movement of said obturator for controlling flow over said valving surface.

2. The assembly defined in claim 1, wherein said pressure responsive means includes means resiliently biasing said obturator away from said valving surface.

3. The assembly defined in claim 1, wherein said pressure responsive means is operative to move said obturator in a direction decreasing flow over said valving surface with increasing pressure in said chamber.

4. The assembly defined in claim 1, wherein said valving surface comprises an annular valve seat and said obturator comprises a poppet configured for closing on said valve seat.

5. The assembly defined in claim 1, wherein said valve body structure has an annular configuration with a radially outwardly extending flange disposed adjacent said first wall portion exteriorly of said chamber.

6. The assembly defined in claim 1, wherein said pressure responsive means includes a flexible diaphragm with a rigid actuator member attached thereto, and connected to said obturator.

7. The assembly defined in claim 1, wherein said body structure has an annular configuration and threadedly engages said inlet fitting.

8. The assembly defined in claim 1, wherein said body structure has an annular configuration with said downstream port formed radially therein.

9. The assembly defined in claim 1, wherein said pressure responsive means comprises a flexible diaphragm having the periphery thereof sealed about said body structure and forming a pressure cavity therewith, said pressure cavity communicating with said downstream port and said valving surface.

10. A method of making a gaseous fuel burner manifold with integral pressure regulator comprising:
    (a) forming a manifold with a first and second oppositely disposed wall portion defining a flow chamber for connection to a burner inlet;
    (b) forming a first cut-out in said first wall portion and disposing a valve body in said first cut-out;

(c) forming a second cut-out in said second wall portion and disposing an inlet fitting in said second cut-out and sealingly engaging said fitting with said valve body;

(d) forming a valving surface communicating with the inlet of said fitting in one of said body and said fitting and forming a port downstream of said valving surface and communicating the port with said flow chamber;

(e) disposing a pressure responsive member on said body and forming therewith a pressure cavity communicating with said port and said valving surface;

(f) disposing an obturator for movement with respect to said valving surface; and, (g) connecting said obturator to said pressure responsive member and moving the obturator in response to changes in cavity pressure and controlling flow over said valving surface to said port.

11. The method defined in claim 10, wherein said step of engaging said fitting with said valve body includes threadedly engaging.

12. The method defined in claim 10, wherein said step of forming a valving surface includes forming an annular valve seat; and, said step of disposing an obturator includes disposing a poppet for movement with respect to said valve seat.

13. The method defined in claim 10, wherein said steps of disposing a pressure responsive member and forming a pressure cavity includes providing a flexible diaphragm and sealing the periphery thereof on said valve body.

14. The method defined in claim 10, wherein said step of disposing said valve body in said first cut-out includes sealing between said body and said cut-out.

15. The method defined in claim 10, wherein said step of disposing said inlet fitting in said second cut-out includes sealing between said fitting and said second cut-out.

16. The method defined in claim 10, wherein said step of moving a valve obturator includes biasing said pressure responsive member in a direction to move said obturator to increase flow over said valving surface.

* * * * *